United States Patent [19]

Jacquet

[11] Patent Number: 5,019,278
[45] Date of Patent: May 28, 1991

[54] CONTINUOUS WASHED SAND FILTER AND WASHER

[75] Inventor: Sten F. Jacquet, Stockholm, Sweden

[73] Assignee: Baker Hughes Incorporated, Houston, Tex.

[21] Appl. No.: 351,152

[22] Filed: May 12, 1989

[30] Foreign Application Priority Data

May 26, 1988 [SE] Sweden .................................. 8801959

[51] Int. Cl.$^5$ ............................................ B01D 24/46
[52] U.S. Cl. ..................................... 210/792; 210/797; 210/807; 210/189; 210/268
[58] Field of Search ............... 210/268, 269, 279, 772, 210/786, 792, 797, 805, 807, 189; 55/77, 242, 256, 390

[56] References Cited

U.S. PATENT DOCUMENTS

| | | | |
|---|---|---|---|
| 1,793,465 | 2/1931 | Coahran | 260/412.4 |
| 2,057,887 | 10/1936 | Elliott et al. | 210/268 |
| 3,019,079 | 1/1962 | Donohue | 210/268 |
| 3,550,774 | 12/1970 | Hirs | 210/269 |
| 3,667,604 | 6/1972 | Lagoutte | 210/268 |
| 4,060,484 | 11/1977 | Austin et al. | 210/279 |
| 4,118,313 | 10/1978 | Hadamovsky et al. | 210/521 |
| 4,126,546 | 11/1978 | Hjelmner et al. | 210/793 |
| 4,159,244 | 6/1979 | Amagi et al. | 210/807 |
| 4,197,201 | 4/1980 | Hjelmner et al. | 210/268 |
| 4,246,102 | 1/1981 | Hjelmner et al. | 210/793 |
| 4,482,457 | 11/1984 | Jacquet | 210/271 |
| 4,702,846 | 10/1987 | Ryynanen | 210/512.2 |
| 4,720,347 | 1/1988 | Berne | 210/268 |

FOREIGN PATENT DOCUMENTS 2511497 9/1976 Fed. Rep. of Germany .

Primary Examiner—Stanley Silverman
Assistant Examiner—Cynthia L. Nessler
Attorney, Agent, or Firm—Skjerven, Morrill, MacPherson, Franklin & Friel

[57] ABSTRACT

A sand filter is provided where dirtied filter media, generally sand, is continuously withdrawn from the filter container and lifted to the top of a juxtaposed separate wash vessel outside the container. The dirty media cascades in zig-zag fashion across and down a series of vertically spaced inclined baffles in the wash vessel extending alternately from opposite sides of the vessel so that a thin, relatively wide media stream falls from one baffle down to the next. A wash liquid, normally clean filtrate from the sand filter container, enters an inlet port adjacent to the bottom of the wash vessel and due to the coaction of the spaced baffles forms vertically-oriented circular flow patterns or vortices in alternative clockwise and counter clockwise directions so that portions of the wash liquid flow are directed to flow along with and in the same direction i.e. co-current flow, as the downwardly progressing and cascading media stream falling from one baffle member to the next baffle member. During this co-current flow, dirt particles are displaced from the dirty media. The cleaned media is returned from the bottom of the wash vessel to the filter container for reuse and dirtied wash water is removed from the top of the wash vessel.

17 Claims, 2 Drawing Sheets

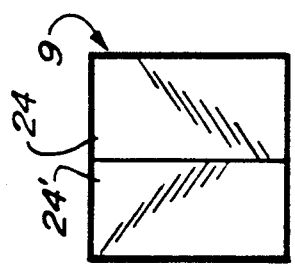
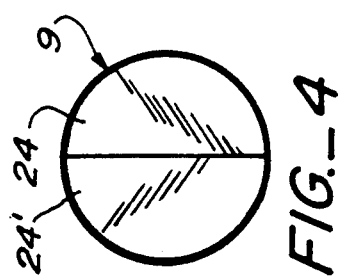
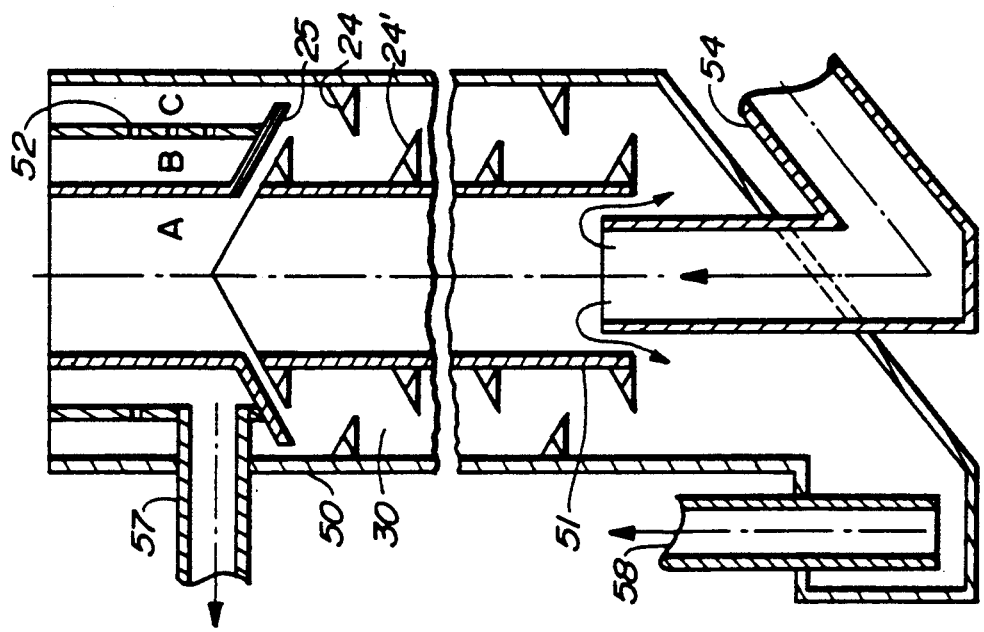
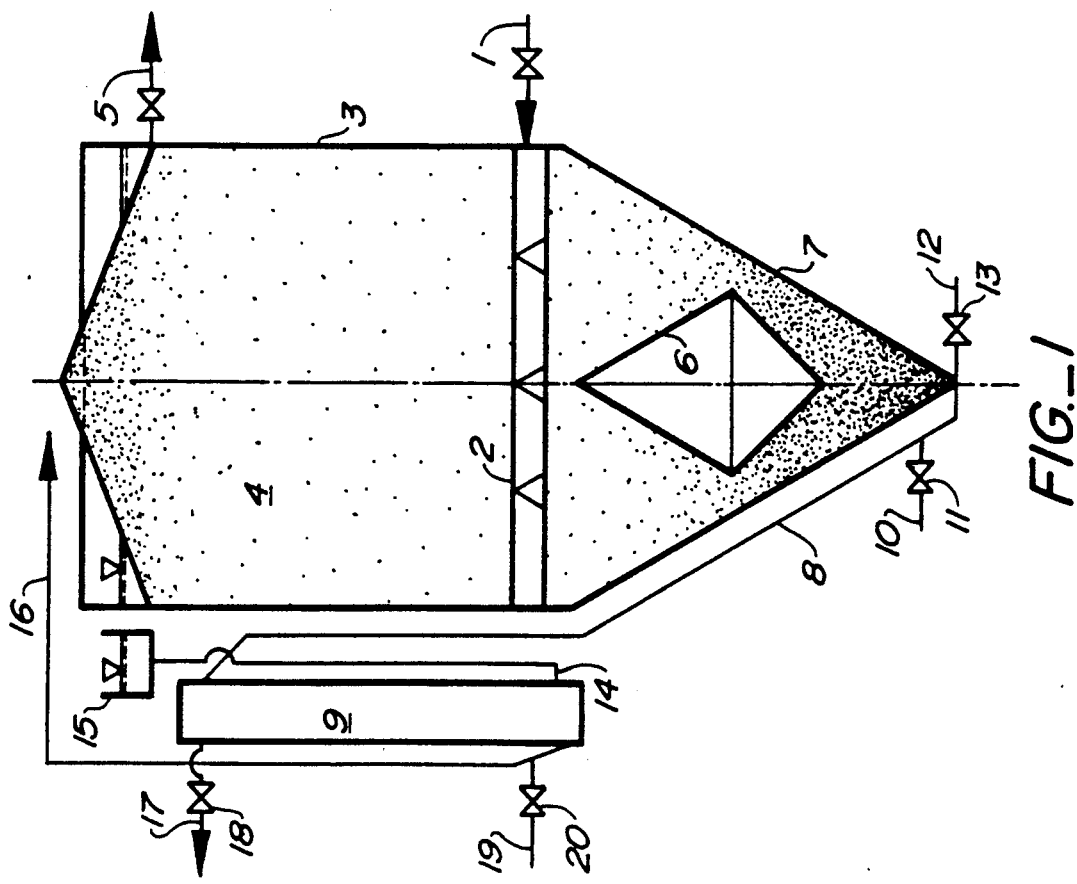

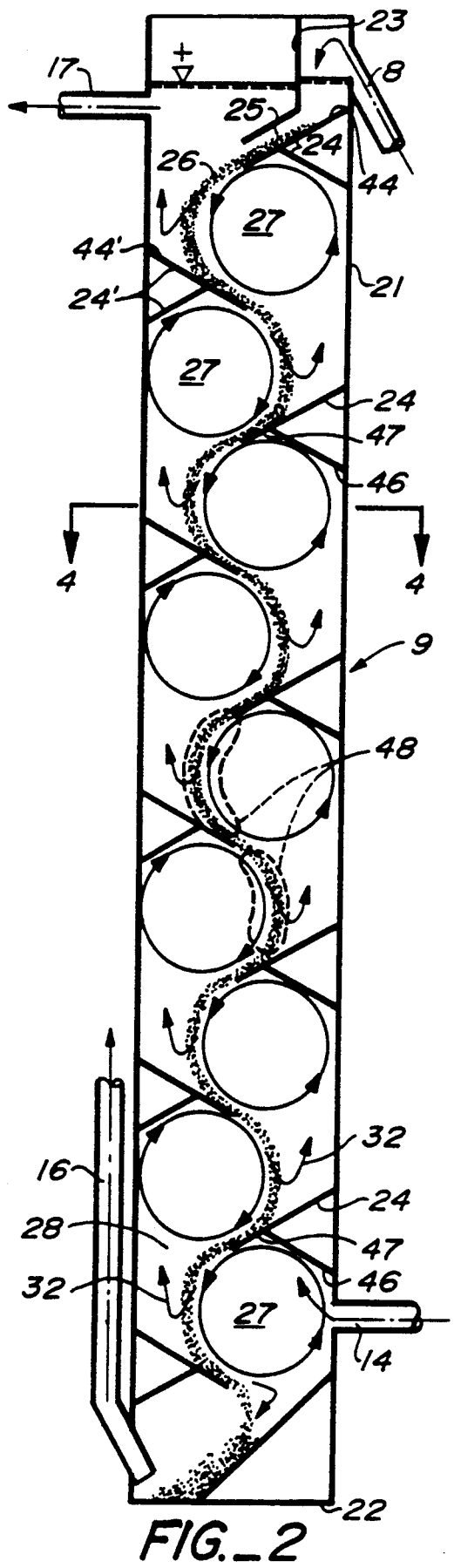

CONTINUOUS WASHED SAND FILTER AND WASHER

This invention relates to a method and an apparatus for filtration of a suspension or an emulsion for treatment of municipal and industrial waste waters or for treatment of raw water for drinking water production.

BACKGROUND OF THE INVENTION

It is already known how to carry out continuous upflow filtration of a suspension or an emulsion through a filter bed as seen for example in Austrian Patent Application A/128/72 and Swedish Patents SE 7602999-0 (U.S. Pat. Nos. 4,197,201 and 4,126,546) and SE 8104869-6 (U.S. Pat. No. 4,482,457).

In each of these three patents, the suspension or emulsion to be treated flows in an upward direction through a filter bed or particles in a container where, one or more means are arranged at the lower part of the filter bed for introduction of the suspension or emulsion to be filtered, one or more means are arranged above the filter bed for withdrawal of filtrate and to form a filtrate zone above the filter bed. Means is provided for the transport of dirty filter media to a device for washing the dirty filter media.

In A/128/72 a washer is placed above the filtrate zone and consists of a hydrocyclone to which the wash liquid is fed to a holder below the washer so a part of the wash liquid flows up through the hydrocyclone and will be withdrawn as reject water at the upper end of the hydrocyclone.

The washer in SE 8104869-6 (U.S. Pat. No. 4,482,457) is located above the filtrate zone and consists of an inclined and horizontal moving screw conveyor-type washer, where dirty filter media is fed to the bottom and wash liquid added to the top. By the rotation of the screw the dirty filter media will be transported up through the wash liquid so the filter media will be cleaned. Washed filter media will be fed from the upper end of the wash device and transported to the top of the filter bed and reject liquid will be withdrawn from the lower end of the wash device.

SE 7602999-0 (U.S. Pat. No. 4,197,201) has a washer located in the filtrate zone above the filter bed and consists of a counter current washer to which the dirty filter media is fed to the upper part of the wash device and flows downwards in counter current to the upward flow of a wash liquid fed at the lower part of the wash device and taken from the filtrate zone above the filter bed. The washed filter material is returned to the top of the filter bed and reject water is withdrawn from the top of the wash device.

In all of these three prior known designs, the dirty filter media has been washed and devices located above the filter bed which will result in the filter apparatus being relatively tall which presents a number of disadvantages.

U.S. Pat. No. 2,057,887 describes another design of a continuous upflow sand filter to which the suspension or emulsion to be filtered is fed to the filter bed by one or more means at the lower part of the filter bed and is withdrawn as filtrate by means at the upper part of the filter bed. The dirty filter media material is withdrawn by lift means at the bottom of the filter tank after which liquid and sediment is removed from the filter media material before cleaned media is returned to the top of the filter tank. This construction also results in a relatively tall apparatus. Furthermore, the construction includes a complicated design for feed of filter media material to the top of the filter tank.

The devices for transport and washing of dirty filter media material and return of washed filter media material to the top of the filter bed are important parts of a continuously operating sand filter. It is also important that these devices are reached easily for observation and control of all the different flows associated with the filter process. The type of filter media material normally used by these types of filters is sand with a grain size of 0.8-1.2 mm which is a highly abrasive material and thus moving parts should be avoided. To be sure that the dirty filter material will be effectively washed, washing should be done under controlled conditions.

SUMMARY OF THE INVENTION

In accordance with the invention, the filtration of a suspension or emulsion will be made through a bed of particles in a container where in the embodiment shown, the filtration will be in an upflow direction through the filter bed. One or more means are located at the lower part of the filter bed for introducing the suspension or emulsion to be filtered, one or more means are located at the upper part of the filter bed for withdrawal of filtrate, and a means is provided for transport of dirty filter media from the lower part of the filter bed to a vessel for washing the dirty filter media. After washing the media a device transports the washed filter media to the top of the filter bed. Means are provided for adding wash water to the washing device as well as means for the withdrawal of reject water from the washer.

One characteristic feature of the present invention is that the transport and washing of the dirty filter media can be made outside and entirely separated from the container with the filter media material filter bed. Furthermore, the device for washing can be located so as to be observed, controlled and maintained from ground level. This location of the washing device affords the opportunity that all flows directly can be observed, measured, and adjusted from the same place on the normal floor level and extra service platforms and related equipment will not need to be installed for these purposes.

Since the transport and washing of the dirty filter media can be made at a level below the top of the filter bed the entire height of the filter can be essentially reduced compared to prior known filter apparatus which also will reduce the costs of installation and servicing.

To reduce the volume of reject or dirty wash water flow from the washer it is desirable that the dirty filter media transported from the bottom of the filter tank to the washer has a low content of water. Furthermore, from an abrasion and wear standpoint it is desired that the transport of the dirty filter media be carried out without any moving parts. Thus, the transport should normally be carried out by an air lift pump consisting of a pipe in which the dirty filter media will be transported by a compressed air transport media injected at the lower part of the pipe. In order to reduce the liquid content of the dirty filter media the suction end of the air lift pump is introduced in the filter material at such a depth that approximately equal parts of dirty filter media and liquid will be transported.

In accordance with this invention the transport of the dirty filter media can also be carried out by an air lift pump. Due to a shorter transport length compared to the lift in the above mentioned Swedish patents, the energy consumption will be reduced with this invention.

It is suggested in the Austrian Patent A/128/72 that the transport of the dirty filter media can be by means of an ejector for which operation a high liquid flow is demanded In order to reduce this flow of liquid it is suggested to reuse a part of the reject or dirty wash liquid from the hydrocyclone where particles first will be separated from the reject liquid before it is pressurized and reused as transport media. The design is complicated and the washer has not shown a sufficient efficiency.

In order to provide a high overall treatment efficiency, effective separation or washing action in the filter bed is desired. High washing efficiency is also desirable so that the washed filter media material does not contain any undesired particles or substances, when the media is returned to the top of the filter bed. The filter media normally consists of a special filter sand with grain sizes between 0.8–1.2 mm. When dirty filter media is transported from the bottom of the filter tank to the wash device, dirt particles are located between adjacent sand grains which are joined together and as a coating on individual sand grains.

During the transport of the dirty media to the washer and during washing, the layers or coatings that occur on the sand grains are removed and washed away together with the dirty particles located between the sand grains. The wash process of the present invention, however, provides a gentle washing action so that the single filter media grains are not eroded or worn out, which would result in a reduced filtration capacity.

In order to achieve an effective and careful cleaning of the filter media which at same time utilizes the lowest possible volume of wash liquid, it is of great importance that the flow of dirty filter media and wash liquid take place under stable conditions in predetermined flow patterns.

This invention also includes a new effective and forgiving washer for cleaning dirty filter media. The washer comprises a normally vertically-disposed vessel having an upper and lower end. Dirtied granular media passes into an media inlet opening at the upper end and is cleaned as it progresses downwardly to the vessel lower end where a media discharge opening permits removal of the cleaned media for return to the filtering apparatus per se. A washing fluid, normally filtrate from the filtering apparatus, enters a washing fluid inlet port under pressure at the vessel lower end is discharged as dirtied wash fluid from an outlet port at the vessel outlet end. The vessel interior contains a plurality of baffle members so that the dirty media flows downwardly in zig-zag directions in a thin, relatively wide stream along inclined flow paths formed by the baffle members. Various baffles coact so that the washing fluid forms vertical circular flow patterns in both clockwise and counter-clockwise directions beneath respective baffle members so that portions of the washing fluid flow are directed to flow along with and in the same direction as the downwardly progressing media stream for the portions of the flow path of the media in which it falls from one baffle member to the next. This results in a very efficient co-current flow washing action of the media and washing fluid.

The co-current flow pattern provided in the washer of this present invention represents a significant departure from (indeed goes against) the accepted wisdom in the industry that counter-current flow of the washing liquid and the media is the most effective flow pattern and washing action. More particularly, the filters shown and described in the U.S. Pat. Nos. 4,126,546; 4,197,201 and 4,246,102 are widely used commercial devices in this and foreign countries. As described at column 4, lines 60–65 of U.S. Pat. Nos. 4,126,546 and 4,197,201 and column 6, lines 54–60 of U.S. Pat. No. 4,246,102, the washers for these commercially accepted filters are specifically designed to have continuous counter-current flow of the filter media and the wash liquid throughout the full extent of the washer device. In U.S. Pat. Nos. 4,126,546 and 4,197,201 at column 4, lines 39 through column 5, line 6, and U.S. Pat. No. 4,246,102 at column 6, lines 33 through column 7, line 1 describe this counter-current flow as being a downward flow of media along the wash path and an upward flow of the wash liquid along that same path. This counter-current flow pattern is recited as resulting in especially favorable conditions for the washing of the media particles. Thus, the accepted wisdom in the industry teaches that not only the flow of the media and wash liquid should be counter-current, but also that counter-current conditions should exist throughout the full extent of the washer. In marked distinction to this prior art teaching, the washer of this invention provides for co-current flow of the media and wash liquid flow paths whenever they come into coincidence, but for flow in opposite or opposed directions only when the flow paths of the media and wash liquid are separated from each other. The flow paths of the media and wash liquid in applicant's washer come into coincidence at those areas of the flow path of the media as the media falls and cascades from the end of one baffle member onto the top of the baffle member beneath it. As described more fully hereinafter, in such areas of coincidence, the overall resultant direction of the wash liquid flow path is in generally the same direction as that for the media, with only a small component of the was liquid flowing at an angle (perhaps an angle of as much as 90 degrees) to the flow path of the media. Thus, the flow of the media and wash liquid in these areas of coincidence is regarded as being co-current. In the remaining areas of the washer, the flow paths of the media and wash liquid are intentionally kept separated or spaced apart so as to avoid any counter-current flow paths which may impinge each other. For example, as shown in FIGS. 2 and 3, those portions of the flow paths of the wash liquid having a significant upward flow component occur closely adjacent to the sides of the washer; whereas the downward flow of the media and wash liquid occurs in the middle section of the washer.

BRIEF DESCRIPTION OF THE DRAWINGS

FIG. 1 is a schematic partial cross-sectional view of the granular media filter and media wash system.

FIG. 2 is a schematic partial cut-away cross-sectional view of the washer vessel.

FIG. 3 is a schematic partial down-up view of a section of an alternative embodiment of the washer.

FIG. 4 is a schematic cross-sectional view of one embodiment of the washer taken on the line 4—4 of FIG. 2.

FIG. 5 is a cross-sectional view of a rectangular embodiment of the washer.

FIG. 6 is a schematic partial cross-sectional view of the lower and upper portions of the FIG. 3 embodiment.

DETAILED DESCRIPTION

Referring to FIG. 1–3 the method and apparatus of the present invention is seen. The suspension or emulsion to be filtered is delivered to the filter tank 3 by a pipe 1 which is connected to one or more spray or inlet distribution means 2 located at the lower part of the filter bed. The suspension or emulsion flows upwards through the filter bed 4 which normally comprises a sand filter media. Activated carbon particles or other known filter media may also be employed. Discharge means (not shown in detail) at the upper part of the filter bed allows filtrate to be withdrawn and transported away from the filter through pipe 5. Alternatively the filtrated liquid can be withdrawn by an overflow (weir) from one side of the filter bed arranged so as to receive the filtrated liquid. In FIG. 1 a filtrate zone extends partly above the filter bed although the filtrate zone can, if so desired, cover the whole filter bed or be located below the whole upper part of the filter bed. Below the filter bed 4 is a conical-shaped distributor means 6 arranged in order to guide the flow of dirty media during its flow downwards into the lower tank part.

Dirty filter media falls by gravity into the tank bottom and is transported away from the bottom part of the filter tank to the upper part of a wash device 9 by suitable lift means, for example an air lift pump 8 into which compressed air is injected by pipe 10 the flow of which can be controlled and adjusted by a needle valve 11. The dirty filter media transported in pipe 8 is viscous. Lower friction against the wall in the pipe 8 can be provided by adding additional liquid into pipe 8 through pipe 12. The amount of this additional liquid can be adjusted by a valve 13. When adding this liquid the capacity of the air lift pump will increase. A suitable liquid for this purpose can be a part of the unfiltrated liquid fed to the filter. By using this liquid a suitable self regulation of the transported dirty filter material to the sand washer can be achieved due to the fact that the volume of the feed liquid from pipe 12 will increase when the head loss through the filter bed increases. On the other hand, the volume of feed liquid will be decreased when the head loss through the filter bed is decreased. Such a self regulation is desirable so as to change the volume of transported dirty media in direct relation to the head loss through the media bed resulting from the media becoming dirty.

The dirty filter material is washed with a suitable wash liquid added to the lower part of the wash device 9 by a pipe 14. The wash device comprises a generally vertically elongated cylindrical tank vessel or a vertical tank vessel having a generally rectangular transverse horizontal cross section. According to the location of the wash device outside and separate from the filter tank different types of wash liquid can be used. Thus, the most suitable and economical wash liquid can be varied from case to case. Depending on the desired treatment efficiency and other considerations, the wash liquid can be unfiltrated liquid, filtrate from the filter, tap water, raw water or other liquid source. Added wash water can be given a constant over pressure compared to the pressure level of the withdrawn reject or dirty wash water from the wash device by using a holder 15 with a constant water level so that the wash water can flow by gravity through the wash device. Conveniently, the wash liquid supply may be a portion of the clean filtrate exiting pipe 5, which is used as a supply to holding tank 15.

The added wash water may be of sufficient volume to function as the transport liquid for carrying the cleaned filter material to the top of the filter bed by pipe means 16. Alternatively, another transport liquid e.g. filtrate, can be added at the inlet end of the transport device feeding pipe 16.

Reject or dirtied wash liquid is withdrawn from the wash device by pipe 17. To adjust the necessary wash liquid flow this can be regulated by an overflow (not shown) at the outlet end of the washer. Alternatively the wash liquid reject flow can be adjusted by regulation of a valve 18 on the reject water pipe 17.

The washed and now clean filter material is withdrawn from the bottom part of the wash device 9 and is transported by, for example, an air lift pump and feed line 16 up to the top of the filter bed. Compressed air is injected to the air lift pump through pipe 19 and the flow rate adjusted by a needle valve 20.

In the washer 9 the dirty filter media material is washed in an unique co-current flow pattern together with a wash liquid. Prior art co-current washing of dirty filter material has been done by having both the dirty filter media material and wash liquid flow in a pipe from the bottom of the filter tank to a holder above the filter bed. From the holder reject or dirty wash liquid is withdrawn and the cleaned filter material is returned to the top of the filter bed. This type of co-current washing has not provided sufficient cleaning of the dirty filter material and seems not to have resulted in any practical application.

Washers used on the market today for continuous filtration are of the so-called counter-current type in which, the dirty filter media are washed in a flow path counter-current to the flow path of the wash liquid. Patent application SE 7602999-0 describes a counter-current washer working without moving parts while in patent application SE 8104869-6 a washer mechanically transports dirty filter media in counter current to a wash liquid.

Heretofore, counter-current washing has been considered to be the only method providing efficient washing action to clean dirty filter media. Counter-current washing is however, impaired by the disadvantage that it will cause instability between the dirty filter media and the wash liquid. This can result in having a major part of the dirty filter media flow through one certain part of the cross section area in the wash device while a minor part of the dirty filter media flows through the remainder of the cross section area. This will mean that a large volume of the wash liquid will flow in counter-current flow through that cross section area in which only the minor part of the dirty filter media flows, and respectively, that only a small volume of the wash liquid will flow in counter-current flow to the major part of the dirty filter media in the other part.

In the resultant washing action, single particles of the dirty filter media are washed in counter-current against different volumes of wash water. Thus, in counter-current washing, a larger volume of wash water has to be fed through the washer in order to get the desired washing result than if all the particles had been washed with an equal volume of wash water.

In accordance to this invention, tests show that such instability of flow can be eliminated and at the same time a high wash efficiency obtained by providing the dirty filter material and the wash liquid with a unique flow pattern in a completely controlled co-current washing action, which is the subject of this invention. A co-current flow pattern of this type is shown in FIGS. 2 and 3.

In FIG. 2, the basic design of the flow pattern for the dirty filter media and the wash liquid is shown in a cross section through the device. Depending on its size and other factors, the washing device may be of circular horizontal or rectangular section as seen in FIGS. 4 and 5, respectively. A circular design can advantageously comprise of one pipe outside another pipe having the same longitudinal axis 33 shown in FIG. 3. The washing device 9 shown in FIG. 1 is representative of both the rectangular and circular wash devices. In the circular embodiment, the baffle means comprises a plurality of flow control baffles 23, 24 and 29 which are of essentially toroidal frusto-conical design and are placed in the space between the two pipes.

The dirty filter media has during the transport through pipe 8 from the filter bed to the wash device gone through a pretreatment so that at least some of the coating of dirt on the surface of the single filter media grains has been removed by the fact that the grains slowly have been rubbed against each other partly during the transport down through the bottom part of the filter tank and partly by the transport up to the wash device. That portion of the dirt which had been washed away from the filter media as it was transported to the washer will essentially consist of free dirt particles and dirty liquid.

The washing of the dirty filter media takes place within a well-restricted flow profile of filter media 26 included in a device with circumscribed walls 21 and bottom 22. The shown flow profile of dirty filter media and the flow of the wash liquid is directed by the flow baffles 23 and 24. Dirty filter media is delivered to the upper part of the washer 9 by pipe 8 whereafter it is transported through the gap 25 between baffles 23 and 24 in a stream or flow path of media which essentially extend the vertical length of the washer device. The volume of liquid which is transported together with the dirty filter media through the pipe 8 flows through the gap 25, with a major part of this liquid and its content of dirty particles thus being expelled directly to the reject water pipe 17.

The rest of the dirty media particles and dirty liquid flows along a downwardly inclined upper surface 44 of a first baffle member 24 extending from one side of the washing device, then dropping to a second flow baffle 24' having a inclined surface 44' extending from an opposite side wall (or from a inner surface of the outer pipe in FIG. 3) and placed below the first baffle 24. As best illustrated in FIGS. 2 and 3, the baffle means comprises a set of first baffle members 24 and a second set of baffle members 24' positioned in vertical arrangement in the washer. The washed filter media is withdrawn from the bottom part of the device and is transported away by a pipe 16. The baffles 24 and 24' are positioned below each other with every second baffle located below and extending from an opposite side of the washer vessel. The baffles 24 and 24' have a shape and spacing between each other such that the dirty filter media 26 will be transported in a thin and well restricted layer obliquely downwards along the upper surfaces of the baffles 24 from which the media will flow in a likewise well restricted and in a somewhat horizontal but inclined downward direction in an equally distributed curtain to fall or cascade against the baffle 24' immediately below. This flow pattern is repeated from baffle to baffle, so that the media follows a generally zig-zag path down through the vessel. The arrows shown symbolize the hydraulical flow pattern of the wash liquid which as a whole flows vertically up within the vessel, along flow paths spaced from the flow path of the media.

Due to the fact that the wash vessel 9 is filled with liquid, the downward flow of the stream of dirty filter media over the baffles creates hydraulic co-current flows of the liquid in circular flow patterns or vortices flowing along with and in the same direction as the flow paths of the media. The baffles 24 and 24' are so designed, particularly by under surfaces 46, 47 of each baffle placed towards each other that the flow of the filter wash liquid across these surfaces enhances the clockwise or counterclockwise vortices 27 of the washing liquid. The contact of these vortices with the filter media in the dashed-line zones 48 will flow co-current with the media as the media flows along the inclined upper baffle surfaces 44, 44' and cascades downwardly in free fall to the next upper surface below. Only two of the co-current zones are marked in FIG. 2 but it can be easily ascertained from the illustrated embodiment that their are nine zones of co-current contact.

The washing of the dirty filter media will occur when a wash liquid is fed to the lower part of the wash device by pipe 14 and is led into the vessel to form the lowest located hydraulic vortice 27 between the two lowest placed baffles 24, 24'. The added wash liquid will thereby be included into the hydraulic vortice and will also have the same internal flow direction or swirl as the vortice. When adding the wash liquid the pressure will increase in the hydraulic vortice compared to the pressure what is existing in the space 28 on the opposite side of the curtain formed by the flowing filter media.

Due to the fact that the periphery of the hydraulic vortice of wash water both touches and flows in co-current flow with the formed curtain or cascade of flowing filter media between each succession of two baffles 24 and 24', the increased pressure inside the hydraulic vortice causes the wash liquid feed, during co-current flow with the curtain of flowing filter media will be forced into the filter media from one side and acts to push out dirt impurities and an equally volume of liquid to the opposite side of the curtain into the space 28, in order to equalize the pressure difference, which give the effect that the curtain of flowing filter media will be washed.

The above pressure influence will mean that the profile of the curtain formed by the flowing filter media will be somewhat changed, meaning that the shown parabola flow will extend somewhat outwardly or inwardly, dependent on the baffle incline direction, which will make it easier for dirty particles to pass between the single particles of the filter media. Through the curtain of flowing dirty filter media there is an in-flow of wash liquid and an out-flow of dirty particles and dirty liquid, i.e. a displacement, all of the time the wash liquid is in co-current flow with the flow of the filter media. The in-flow of wash liquid is from one side of the curtain and the out-flow of dirty particles and dirty liquid will occur at the opposite side in accord with the shown arrows 32.

The whole washing will occur in co-current flows of media and wash liquid and there is essentially no difference between the velocity of the filter media and that of the wash liquid. From the space 28 the prior separated dirty particles and dirty liquid will be deflected upwardly by the highest parts of the inclined baffles and transported to the next above located hydraulic vortice, where the same co-current washing action will be repeated. The specific transport upwards of the wash liquid from space 28 to the next above located hydraulic vortice will not effectively take part in or along the washing path of the dirty filter media. Likewise the transport upwards of wash liquid in a vortice from the above corresponding space 28 to and including its deflection by baffle under surfaces 46, 47 will not involve washing the filter media until it joins the next above located hydraulic vortice.

The combined effect which will occur between the flow of the dirty filter media both along the upper sides of the baffles 24 and 24' and in the curtain between the baffles 24, 24' and the forming of co-current media flow and hydraulic vortices has in tests given a surprising equal distribution and flow of the dirty filter media across the entire width of the baffle members and along its whole flow path during the washing. The added wash liquid will on the other hand receive a very equal and stable flow pattern in the hydraulic vortices before it will become a part of the washing of the dirty filter media.

The wash liquid will hereby be fed in a very equal and uniform co-current flow to the curtain of dirty filter media and also receive the same velocity as the curtain has and even be equally distributed along the same.

By the fact that the curtain of the dirty filter media flows throughout in a very thin layer of approximately 1-3 mm in depth, and furthermore, will flow in a very stable and equal flow, there will only be a need to add a relatively small volume of wash liquid to replace the dirty liquid which is located between the single filter media particles in the curtain. This method to wash the dirty filter media in a controlled co-current flow between the filter media and the wash liquid will result in a quite stable state flow pattern without forming currents and eddys resulting in turbulence or short-circuiting.

These stable and controlled flows in co-current flow in accordance to this invention will result in having all portions of the mass of dirty filter media being washed with approximately the same volume of wash liquid. This is a unique method and has not been suggested by prior known techniques, regardless of which wash flow directions were used. The added wash liquid can furthermore be effectively used by the fact that the same wash liquid can be led through all of the washing steps in the device. The wash liquid will, due to this, become more and more dirty the more numerous the washing steps it passes through and at the same time it washes more and more dirty filter media. The washer is dimensioned so that the washed filter media, after passing through the multiple co-current washing zones, is clean enough to be fed back to the top of the filter bed.

Besides a low wash water consumption, tests have further shown that a very high wash efficiency can be established. The filter media is subjected to only gentle washing action and there are no risks for injurious wear of the media. The top surface of the baffle 24 may be provided with riffles or the like so that removal of any remaining dirt layer on the single filter media particles can be facilitated.

This invention is not limited to that shown specifically in FIG. 2. FIG. 3 shows a partial cross section of another embodiment of washer. Below three of the four baffles 24, 24', a set of flat downwardly inclined third baffle members 29 are incorporated. These baffles 29 have an inclined horizontal length approximately equal to the length of baffles 24, 24'. The arrows demonstrate the hydraulic flow over the upper and under sides of the baffles 29. The flat baffles 29 are designed in such a way that hydraulic vortices 30 are formed. When feeding a wash liquid past these baffles, a higher pressure will be present in the hydraulic vortices in accordance with the description in FIG. 2. Thus, the wash liquid will be deflected and flow through the gap 31 between the baffles 24, 24', as the case may be, and the flat profile 29 and be directed in co-current flow with the filter media and be completely or partly transported through the curtain of flowing dirty filter media as explained above.

During this flow of dirty media, dirty particles will be pushed out from the filter media and the dirty liquid between the filter media grains will partly or completely be displaced by the wash liquid which will force the dirty liquid out on the opposite side of the curtain. This displacement method is described above with respect to FIG. 2.

The dirty filter media can be given such a flow pattern that the dirty filter media particles during their flow between baffles 24 and 24' will not actually contact the flat baffle 29. Alternatively, the media flow pattern can be controlled by the inclination of the baffle means such that the filter media will contact the flat baffle 29 during its flow between baffles 24 and 24' in seriatim.

Due to the fact that the added wash liquid can be transported through all the washing steps in the washing device 9 the wash liquid will become more and more dirty the more numerous washing steps it will pass through and at the same time wash a greater volume of dirty media particles in a co-current flow. The third baffle members 29 can be of advantage when washing out a heavy amount of particles from the dirty media or if the dirty particles are large.

The hydraulic vortices will rotate essentially vertically and in co-current flow in predetermined portions of the granular media flowpath. With the flow of the curtain of dirty filter media, the content of dirty particles inside the hydraulic vortice will be forced out to the periphery of the vortice by centripetal force. When they have reached the top of the vortice, they will be deflected by the under face concavities of the baffles 24, 24' and automatically be transported into the gap 31 together with the wash liquid. Tests has shown that a wash device according to this invention can result in high washing efficiency and also take care of high shock loadings of impurities.

As seen in FIG. 6, frusto-conical baffles 24, 24' are positioned generally horizontally in annulus 30 between vertical pipes 50 and 51. Dirty filter media is fed into space A, through gap 25 and then cascades by gravity flow from baffle 24 to baffle 24' and to similar baffles therebelow. Wash water such as filtrate enters inlet pipe 54. Dirty rejected water is withdrawn upwardly to space C and moved through sidewall apertures 52 to space B which is connected to reject water pipe 57 Air lift 58 transports cleaned media back to the filter bed top.

This invention is not restricted to named examples but can also include the widest interpretation of the description. It is also possible to complete the wash device with further baffles, e.g. above and in parallel with the top surface of the means 24. Furthermore, it is also possible to place the wash vessel in another position against the filter tank other than that which has been described. Furthermore, it is not necessary that the washing vessel be equipped with a bottom, in which event the washed filter media can be transported directly to the top of the filter bed.

I claim:

1. A stand-alone washer system for co-current washing of granular filter media made dirty in a separate treatment filter, with a washing fluid, comprising:
   a vertical vessel having an upper end and a lower end and a vessel cavity therebetween;
   a granular media inlet opening adjacent the upper end of the vessel adapted to receive a flow of dirty media to be washed, with the media being cleaned by washing fluid as the media flows down toward the lower end of the vessel;
   a granular media discharge opening in the vessel adjacent the lower end thereof for discharge of cleaned media;
   a washing fluid inlet port in the vessel lower end for receiving a flow of washing fluid under pressure;
   a washing fluid outlet port adjacent the vessel upper end spaced upwardly from the inlet port for discharge of dirtied washing fluid, with the washing fluid cleaning the granular media as the fluid flows to the outlet port;
   baffle means comprising a plurality of spaced downwardly inclined baffle members positioned in the vessel between the granular media inlet opening and granular media discharge opening in vertical arrangement within the vessel said baffle members extending alternatively from opposed sides of said vessel, each of said baffle members being affixed in abutting relation to one side of the vessel to prevent passage of both granular media and washing fluid therepast, each of said baffle members extending toward the other side of the vessel and terminating adjacent the vertical center of the cavity in the vessel, the outer edge of each baffle member forming a single passageway with the other side of said vessel for directing the granular media to continuously flow down the incline of said baffle members toward the lower discharge opening in a relatively wide, but thin stream along generally inclined flow paths cascading from one of said baffle members through said single passageway to a baffle member therebelow, said baffle members further comprising means for directing the washing fluid to flow generally upward within the vessel in a series of vortices generally devoid of granular media, said vortices extending along with and in the same direction as the stream of granular media as the media cascades from one of the baffle members to the baffle member below it and wherein a portion of said washing fluid flows through said cascading granular media wide thin stream while retaining the flow path of the granular media in said relatively wide, thin stream as the media flows down between adjacent baffle members; and
   wherein the granular media while flowing in a relatively wide, thin stream is washed by the washing fluid passing along and through said granular media stream.

2. The washing system as set forth in claim 1 wherein each baffle member presents a generally inverted-V underside closed face for directing the washing fluid to flow in a generally vertical vortical pattern beneath the baffle member.

3. The washing system as set forth in claim 1 further comprising a plurality of additional baffle members, each additional baffle member being associated with and positioned between one of said spaced baffle members, with the upper face of the additional baffle member being generally parallel to but spaced from the upper face of the associated spaced baffle member to form a gap for directing the flow of washing fluid between the spaced baffle members and the additional baffle members.

4. The washing system as set forth in claim 1 wherein the washing fluid inlet port is positioned adjacent the bottom of the vessel and the washing fluid outlet port is positioned adjacent the top of the vessel.

5. The washing system as set forth in claim 1 wherein the washing fluid is a liquid.

6. The washing system as set forth in claim 5 wherein the washing fluid is a filtrate from said treatment filter.

7. The washing system as set forth in claim 1 wherein the granular filter media is sand.

8. The washing system as set forth in claim 1 wherein the granular filter media is activated carbon particles.

9. The washing system as set forth in claim 1 wherein the vessel is of generally rectangular shape in horizontal section.

10. The washer system of claim 1 further comprising:
    a filter tank holding a quantity of said granular media;
    a tank inlet port for receiving a continuous flow of dirty liquid to be cleaned by the media as the liquid flows there through;
    a tank outlet port for discharge of cleaned liquid;
    a media inlet opening in the tank comprising means for receiving a continuous flow of cleaned media from said vessel granular media discharge opening; and
    a media outlet opening in the tank comprising means for delivering dirtied filter media to the vessel granular media inlet opening.

11. The washing system as set forth in claim 1 wherein the vessel is of generally circular shape in horizontal cross-section.

12. The washing system as set forth in claim 11 wherein the upper faces of said baffle members are of generally frusto-conical configuration.

13. A method for co-current washing of granular filter media made dirty in a water treatment filter, with a washing fluid, comprising the steps of:
    providing a vessel for holding a quantity of granular filter media and having upper and lower ends and baffle means in a vessel cavity therebetween, said baffle means comprising a plurality of inclined baffle members in spaced vertical arrangement in the vessel and extending alternatively from opposite sides of the vessel;
    delivering a continuous flow of dirty media to be cleaned to the vessel at a point adjacent its upper end;
    withdrawing cleaned media from the vessel at a point adjacent its lower end;
    delivering a continuous flow of clean washing fluid to the vessel at a first location;
    withdrawing dirtied washing fluid from the vessel at a second location;
    directing the granular media to flow down through the vessel in a continuous relatively wide, but thin stream along a generally inclined flow path on an upper surface of each baffle member with portions of the flow path of the media cascading freely between each of the baffle members and the baffle member below it;

directing the washing fluid to flow in hydraulic vortices within the vessel along with and in the same direction as the streams of granular media for said portions of said flow path of the granular media for retaining the flow of granular media in said relatively wide, thin stream for substantially its entire flow through the vessel;

directing a portion of said vortices through said freely cascading granular media wide thin stream; and wherein the granular media while flowing in a relatively wide, thin stream is washed by the washing fluid.

14. The method of claim 13 wherein the washing fluid is directed in vortice flow in a series of circular flow patterns spaced apart in a vertical array within the vessel.

15. The method of claim 14 wherein the granular media is directed to flow a generally zig-zag flow pattern as it flows down through the vessel, each segment of the flow pattern of the granular media being generally tangent to one of the vortice flow patterns of the washing fluid.

16. A washer system for co-current washing of granular filter media made dirty in a separate treatment filter, with a washing fluid, comprising:

a vessel having an upper end and a lower end and a cavity therebetween;

a granular media inlet opening adjacent the upper end of the vessel adapted to receive a flow of dirty media to be washed, with the media being cleaned by washing fluid as the media flows down toward the lower end of the vessel;

a granular media discharge opening in the vessel adjacent the lower end thereof for discharge of cleaned media;

a washing fluid inlet port in the vessel for receiving a flow of washing fluid under pressure;

a washing fluid outlet port spaced from the inlet port for discharge of dirtied washing fluid, with the washing fluid cleaning the granular media as the fluid flows to the outlet port; and baffle means comprising a plurality of spaced inclined baffle members positioned in the vessel between the granular media inlet and discharge openings in vertical arrangement within the vessel, each of said baffle members being alternatively positioned generally at one side of the vessel, extending toward the other side of the vessel to form a single passageway only at a cantilevered end of each baffle member, said cantilevered end terminating adjacent the vertical center of the cavity in the vessel, each of said baffle members comprising means for directing the granular media to flow down toward the lower discharge opening in a relatively wide, but thin stream along generally inclined flow paths, said baffle members further comprising means for directing the washing fluid to flow within the vessel in a vortice along with and in the same direction as and tangentially to and through the stream of granular media as the media flows from one of the baffle members to the baffle member below it for retaining the flow path of the granular media in said relatively wide, thin stream as the media flows down between adjacent baffle members without substantial mixing of said media and said washing fluid.

17. The washer system of claim 16 wherein each baffle member presents a generally inverted-V underside face for directing the washing fluid to flow in a generally vortice pattern beneath each of the baffle members.

* * * * *